United States Patent

[11] 3,609,285

| [72] | Inventors | August F. Scarpelli Warren; Frederick J. Trulson, Detroit, both of Mich. |
|---|---|---|
| [21] | Appl. No. | 757,320 |
| [22] | Filed | Sept. 4, 1968 |
| [45] | Patented | Sept. 28, 1971 |
| [73] | Assignee | General Motors Corporation Detroit, Mich. |

[54] METHOD AND APPARATUS FOR MONITORING WELD QUALITY
9 Claims, 4 Drawing Figs.

[52] U.S. Cl. ..................................................... 219/109
[51] Int. Cl. ..................................................... B23k 11/24
[50] Field of Search ......................................... 219/108, 109, 110, 114, 86; 324/34 P, 34 TK

[56] References Cited
UNITED STATES PATENTS

| 2,417,292 | 3/1947 | Coake | 324/34 P UX |
|---|---|---|---|
| 2,971,263 | 2/1961 | Rockafellow | 324/34 P UX |
| 2,851,584 | 9/1958 | Sciaky | 219/86 |
| 3,400,242 | 9/1968 | Waller | 219/110 |
| 2,472,042 | 5/1949 | Davies | 219/110 |
| 2,472,368 | 6/1949 | Cox et al. | 219/86 |
| 3,345,493 | 10/1967 | Guettel et al. | 219/110 |
| 3,417,221 | 12/1968 | Hayward | 219/109 |

FOREIGN PATENTS

| 899,233 | 6/1962 | Great Britain | 324/34 P UX |

Primary Examiner—J. V. Truhe
Assistant Examiner—J. G. Smith
Attorneys—Jean L. Carpenter, Paul Fitzpatrick and Warren D. Hill ABSTRACT: A circuit for monitoring spot welding is responsive to electrode separation and welding current and voltage to monitor the weld soft point and upset, the cold length of the parts, the number of cycles of welding current, and the energy consumed in producing the weld nugget. A reject signal is provided if any of the five parameters fall outside of predetermined limits. A special feature is the upset circuitry which uses a memory circuit and a comparison circuit to compare the initial electrode separation with the final separation.

PATENTED SEP 28 1971 3,609,285

INVENTORS
August F. Scarpelli, &
BY Frederick J. Trulson

Warren D. Hill
ATTORNEY

METHOD AND APPARATUS FOR MONITORING WELD QUALITY

This invention relates to a method and means for monitoring weld quality and particularly for using several welding parameters to test the quality of a weld as the weld is being made.

It is well known that a number of variable parameters occurring during a spot welding operation affect the quality of the weld. It has been found that the soundness of weld may be tested nondestructively while the weld is being made by monitoring one or more of the parameters during welding. The particular parameters which are critical depends upon the specific welding application. It has further been found that when large numbers of similar parts are to be welded, the welding parameters for such parts can be predetermined and used as standards against which to compare the welding operations during production runs. In particular, the major parameters to be monitored are the weld soft point, the upset, the cold length of the parts, the number of welding current cycles and the total energy consumed within the weld nugget. Of these, upset and energy consumption are often considered to be the most important parameters.

It is therefore an object of this invention to provide a method of determining weld quality by monitoring weld upset.

It is another object of this invention to provide an electrical apparatus for measuring weld upset.

It is further object of the invention to provide an apparatus for simultaneously measuring the energy consumed in forming the nugget and weld upset.

It is still another object of the invention to provide electrical apparatus for simultaneously measuring several welding parameters including soft point, upset, cold length, number of welding current cycles and the energy consumed in forming the nugget.

The invention is carried out by sensing initial welding electrode separation, memorizing that value and comparing it to final electrode separation at weld termination.

The invention is also carried out by providing an electrical transducer means for sensing the initial position of a movable electrode, a memory circuit for registering the initial electrode position, means for comparing the memorized initial position with the final electrode position, a limit circuit for determining whether the upset value lies within an acceptable range and a means for providing a reject signal in the event the upset value is not acceptable. In addition, indicating and control means responsive to the reject signal are provided.

The invention is further carried out by providing an electrical electrode position transducer means connected to the inputs of a soft point circuit, a cold length limit circuit and a upset limit circuit and by providing a cycle limit circuit and means for simultaneously sampling the outputs of all such circuits at the end of a cycle to determine whether any of the measured parameters are outside an acceptable range. The invention further contemplates an additional input to the reject gate comprising a welding nugget energy monitor and limit circuit.

The above and other advantages will be made more apparent from the following specification taken in conjunction with the accompanying drawings wherein like reference numerals refer to like parts and wherein.

Figure 1:
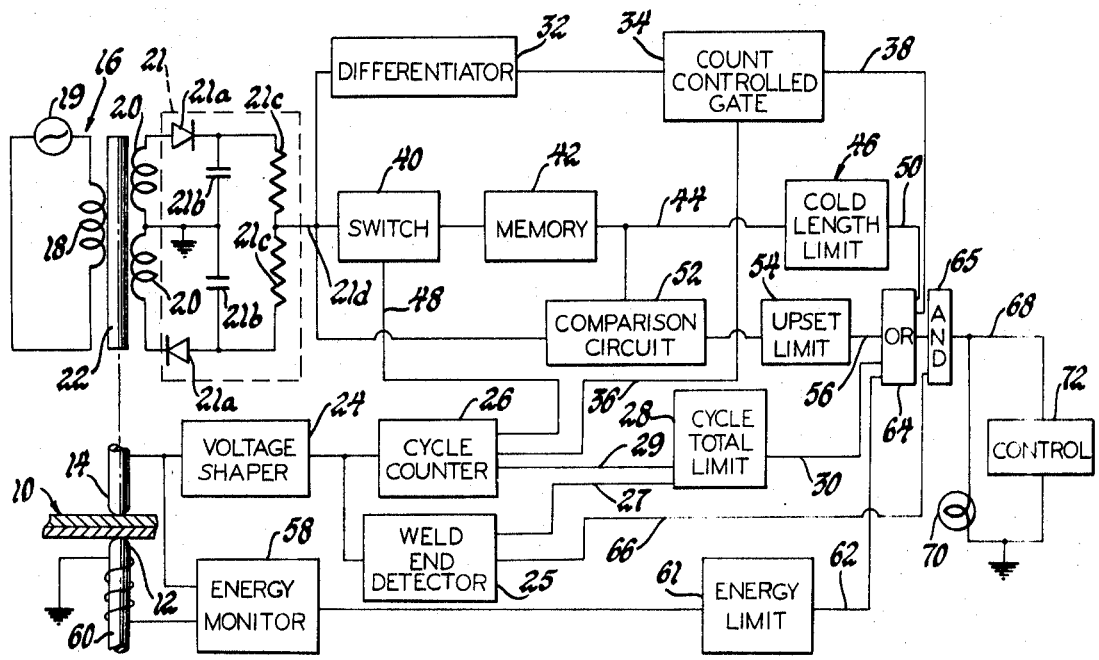
FIG. 1 is a diagrammatic representation of an electrical apparatus according to the invention.

Referring first to FIG. 1, a pair of parts 10 to be welded are contacted on either side by a lower electrode 12 and upper electrode 14 of a conventional spot-welding machine, which is adapted to clamp the parts to be welded between the electrodes and to maintain electrode pressure on the part while electrical power is applied by the electrodes to the part to effect a weld. For convenience, the lower electrode 12 is taken to be stationary and the upper electrode 14 to be movable. To sense the displacement of the movable electrode 14, there is provided an electrical transducer or sensor in the form of a linear variable differential transformer (LVDT) 16 having an exciting coil 18 connected to an alternating voltage source 19, a pair of pickup coils 20 having a center tap connected to ground, and a movable core 22 therebetween to vary the inductance between the coils 18 and 20. The core 22 of the LVDT 16 is mechanically connected to the movable electrode 14. A demodulator 21 is connected to the pickup coils 20 to filter and combine the output of the coils 20 to produce a signal which is linear function of the displacement of the core 22 and hence of the electrode 14. The demodulator 21 includes a pair of diodes 21a each connected to an end of one of the coils 20 to produce half-wave rectification of the coil output. Each diode is connected to a filter comprising a capacitor 21b between the diode 21a and ground and a resistor 21c between the diode 21a and an output line 21d.

Figure 2:
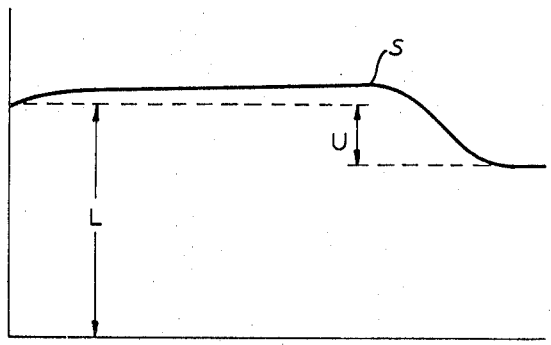
FIG. 2 is a graphical illustration of welding electrode displacement.

The output of the demodulator 21 during a typical welding period is illustrated in FIG. 2, wherein electrode separation is plotted against time. Before welding current is applied to the electrodes 12 and 14, the electrode separation is equal to the combined thickness of the parts 10 referred to hereinafter as the cold length L. If welding current is applied, the heat generated within the parts 10 causes them to expand and the electrode separation to increase gradually until the metal begins to soften at the soft point S. Then the electrodes, due to the force applied thereto by the welding machine, tend to squeeze together into the softened metal to reach a final separation at the termination of the weld. The difference between the cold length L and the final separation is called the upset U. These three parameters, the cold length L, the upset U and the time at which the soft point S occurs, are useful in determining the ultimate weld quality. The total number of weld cycles and the energy consumed in the weld nugget are also important parameters which may be used to monitor weld quality.

Figure 4:
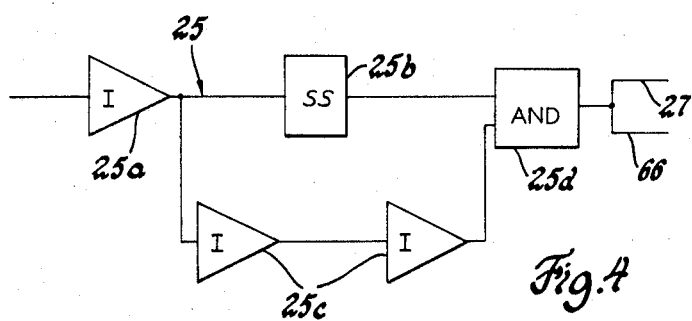
FIG. 4 is a diagrammatic representation of the weld end detector of FIG. 1.

Referring again to FIG. 1, the cycle monitoring circuit for counting the number of cycles may be connected to any portion of the welding power supply where the welding voltage may be sensed. As shown, a voltage shaper 24, preferably a squaring amplifier, is connected to the welding electrode 14 and for each pulse of welding current produces an output pulse in a form suitable to drive a counting circuit shown as cycle counter 26. The cycle counter 26 preferably comprises a conventional electronic decade counter having output conductors connected so as to transmit output pulses at predetermined counts. As an adjunct to the cycle counter a weld end detector 25 is provided to give a signal at the termination of the weld. As shown in FIG. 4, the weld end detector 25 includes an inverter 25a in the input and having its output connected to a single-shot multivibrator 25b and to two inverters 25c in cascade. The multivibrator 25b and the final inverter 25c are connected to an AND gate 25d which supplies an output signal to lines 27 and 66. The single-shot multivibrator 25b is selected to remain off after triggering for a duration of three-fourths of a cycle and then turn on. The cascaded inverters 25c compensate for the rise time of the multivibrator 25b providing overlap at the gate 25d and preventing premature pulsing at the output of the gate 25d. With this arrangement, the square wave inputs to the AND gate 25d will be out of phase until the end of the weld when both inputs are on thereby providing a signal on lines 27 and 66 when the weld terminates.

An output of the cycle counter 26 on conductor 29 is connected to a cycle total limit circuit 28 which will generate an output voltage on line 30 if the total number of cycles indicated by cycle counter 26 is outside an acceptable range. The conductor 27 is energized by the weld end detector 25 at the termination of the weld and the conductor 29 is energized by the cycle counter 26 in a predetermined range of counts corresponding to the desired number of weld cycles. The cycle total limit circuit 28 comprises a conventional NOT AND gate which will produce an output voltage on line 30 at all times except when both conductors 27 and 29 are energized. Thus, if it has been determined that a satisfactory weld may be made on a particular set of parts by 40 cycles of welding current plus or minus 2 cycles, then the cycle total limit circuit 28 will be preset to accept between 38 and 42 cycles by reason of the energization of the conductor 29 by the cycle counter 26 in that range and will produce a reject signal if a greater or lesser number of cycles are actually used to make the weld. It will thus be seen that this circuit as well as others of the monitoring system effect a comparison of a process event vs. time required to achieve a predetermined value.

The soft point test circuit includes a differentiator 32 connected to the demodulator 21 and having its output connected to a count-controlled gate 34. The differentiator 32 comprises a capacitively coupled operational amplifier which produces a sharp voltage swing when the demodulator 21 output changes slope. The count-controlled gate 34 is controlled by an output on line 36 from the cycle counter 26. When the demodulator 21 signal as shown in FIG. 2 changes from a positive slope to a negative slope at point S, the differentiator 32 generates a pulse which goes to the count-controlled gate 34. The cycle counter output 36 controls the gate 34 so that it will be energized during the critical desired soft point period and if the pulse from differentiator 32 is received outside that period, then the count-controlled gate 34 produces a reject pulse on the line 38. Thus, if it has been determined that for an acceptable weld the soft point must occur between 17 and 22 cycles, the cycle counter 26 will be programmed to produce outputs at those times to control the gate 34. The count controlled gate 34 may for example be an RS flip-flop circuit with a binary input which produces a logic reversal with every input pulse. The pulse from differentiator 32 is fed to the set input and the timing line 36 is connected to the binary input. The set output of the flip-flop circuit is connected to line 38. If the soft point pulse from the differentiator 32 occurs between the 17th and 23rd cycle, the flip-flop is set for acceptance and there is no output signal on line 38. If, however, the soft point pulse occurs either before the first timing pulse or after the second, the flip-flop is set for rejection to produce an output on line 38.

The cold length monitoring circuit includes a memory means comprising a relay switch 40 connected to the demodulator 21 and a memory circuit 42 comprising an operational amplifier having an output on line 44 leading to a cold length limit circuit 46.

Figure 3:
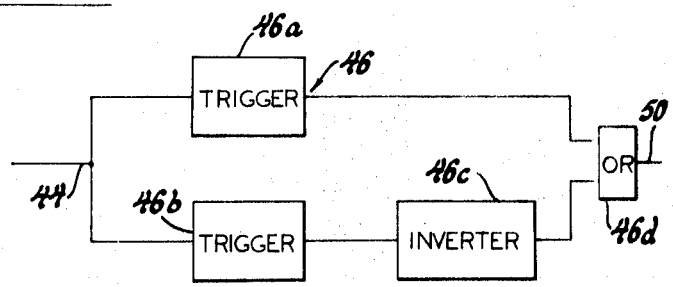
FIG. 3 is a diagrammatic representation of a limit circuit of FIG. 1.

The cold length limit circuit 46 is more fully set forth in FIG. 3 and includes a Schmidt trigger 46a connected between line 44 and an OR gate 46d having in parallel therewith a second Schmidt trigger 46b in series with an inverter 46c. The outputs thereof are fed to the OR gate 46d. The Schmidt triggers 46a and 46b have biased inputs so adjusted that each has a switching point at the high or low limit of the acceptable cold length range. Thus, if an input signal between 3 and 4 volts on line 44 represents an acceptable cold length, the trigger 46b will be set to switch on at 3 volts and the trigger 46a at 4 volts. Then for signal values less than 3 volts, the trigger 46b output will be off and the inverter 46c output will be on to provide a reject signal on line 50. At signal values between 3 and 4 volts, trigger 46b will be on and inverter 46c will be off so that there will be no reject signal on line 50. At signal values above 4 volts, trigger 46a will turn on to provide a reject signal on line 50.

In operation, the relay switch 40 is operated by the cycle counter 26 which produces a signal on line 48 at the beginning of the welding period. The switch 40 then is normally closed and allows the memory circuit 42 to store a signal proportional to the cold length L. When the welding period begins, switch 40 opens so that the memory circuit 42 will not be affected by the subsequent changes in the LVDT 16 output. The memorized value of L then is fed to the cold length limit circuit 46 which produces a reject signal on the output line 50 if the signal L is not within predetermined limits.

The upset monitoring circuit includes the memory means having the switch 40 and the memory circuit 42 as well as a comparison circuit 52 connected to an upset limit circuit 54. The upset limit circuit is structurally the same as the cold length limit circuit 46. The comparison circuit 52 is a differential amplifier which has an input of the cold length L from line 44 and an input from the demodulator 21. The latter input is subtracted from the first to provide an output proportional to the upset U. The upset limit circuit 54 then will generate a reject signal on line 56 if the value of the upset U is not within predetermined limits.

In operation of the upset monitoring circuit, the parts are clamped between the electrodes 12 and 14 and the welding power is applied. The switch 40 opens at the beginning of the weld operation so that the memory circuit 42 stores a signal proportional to the initial electrode separation. When the weld is completed the comparison circuit 32 subtracts the signal from the demodulator 21 from the signal stored in the memory 42. The resulting difference signal is proportional to the amount of upset and is detected by the upset limit circuit 54 which determines whether the difference signal is within a predetermined range. If not, a reject signal is produced.

The energy monitor circuit includes an energy monitor 58 having as inputs the welding voltage taken from electrode 14 and a signal proportional to welding current derived by a pickup coil 60 surrounding the electrode 12. The energy monitor 58 is fully described in U.S. Pat. Treppa et at. No. 3,389,239 and provides an output which is a measure of energy consumed within the weld nugget during its formation. This accomplished in the energy monitor 58 by providing circuits for subtracting a signal proportional to the current from the welding voltage and multiplying the resulting difference signal by a welding current signal. The resulting product signal is integrated to derive an output signal which represents the energy consumed within the nugget. This output is fed to an energy limit circuit 61 which provides a reject signal on output line 62 if the energy signal is not within acceptable limits. The energy limit circuit is like the cold length limit circuit 46.

All of the output lines 30, 38, 50, 56 and 62 are connected to an OR gate 64 which has its output connected to an input of an AND gate 65. Line 66 from the weld end detector 25 is connected to another input of the AND gate 65. Line 66 is energized at the termination of the weld so that if the OR gate 64 passes a reject signal at that time, the AND gate 65 will produce a reject output signal on line 68. However the AND gate 65 is disabled during the welding period to block any spurious reject signals which develop before the weld is complete. The reject output signal on line 68 is fed to utilization means including an indicating means such as a lamp 70 as well as a control circuit 72 such as a relay coil which can be used for example to arrest operation of the welding machine or to cause rejection of the welded part 10.

It will thus be seen that by the use of the method and apparatus set forth herein the operation of a welding machine can be monitored to assure that the essential welding parameters are held within acceptable limits and to indicate when an unsatisfactory weld has been produced and to stop further operation of the machine so that any necessary corrections of the welding control or the parts to be welded can be made.

The embodiment of the invention described herein is for purposes of illustration only and the scope of the invention is intended to be limited only by the following claims:

It is claimed:

1. Weld quality-monitoring means for welding equipment having a plurality of spaced electrodes and means to apply clamping pressure and welding power to opposite sides of parts to be welded together, said quality-monitoring means having weld upset-monitoring means including sensor means for producing a signal as a function of separation of the electrodes, said sensor means being connected with one of the electrodes to vary its output signal as a function of the separation of the electrodes, first switching means connected to the sensor means, a memory circuit connected to the first switching means to store the signal at the initiation of the welding operation, a comparison circuit connected to the sensor means and to the memory circuit to provide a signal indicative of the displacement of the said one electrode at the conclusion of the weld after the electrodes have pressed into the surfaces of the parts to be welded relative to its initial position, and circuit means for determining whether the signal is within acceptable limits, whereby weld upset and its acceptability is determined.

2. Weld quality-monitoring means for welding equipment having a plurality of spaced electrodes and means to apply clamping pressure and welding power to opposite sides of parts to be welded together, said quality-monitoring means having weld upset-monitoring means including inductance means for producing a signal as a function of separation of the electrodes, said inductance means having a movable core connected to one of the electrodes to move therewith and change the inductance value of the inductance means, demodulator means connected to the inductance means, first switching means connected to the demodulator means, a memory circuit connected to the first switching means to store the signal, a comparison circuit connected to the demodulator means and to the memory circuit to provide a signal indicative of the displacement of the said one electrode relative to its initial position, limit circuit means connected in series with the comparison circuit for determining whether the signal is within acceptable limits, further switching means in series with the comparison circuit for effecting an output indicative of the weld acceptability, and means for actuating the first switching means at the initiation of welding and for actuating the further switching means at the termination of welding.

3. Weld quality-monitoring means for welding equipment having a plurality of spaced electrodes and means to apply clamping pressure and welding power to opposite sides of parts to be welded together, said quality-monitoring means including inductance means for producing a signal having a movable core connected to one of the electrodes to move therewith and change the inductance value of the inductance means, demodulator means connected to the inductance means, first switching means connected to the demodulator means, a memory circuit connected to the first switching means to store the signal, a comparison circuit connected to the demodulator means and to the memory circuit to provide a signal indicative of the displacement of the said one electrode relative to its initial position, limit circuit means in series with the comparison circuit for determining whether the signal is within acceptable limits, further switching means in series with the comparison circuit for effecting an output indicative of the weld acceptability, and means for actuating the first switching means at the initiation of welding and for actuating the further switching means at the termination of welding, wherein the switching-actuating means includes a cycle counter having an output energized at the initiation of welding and connected to the first switching means, and a weld end detector having an output energized at the termination of welding and connected to the further switching means.

4. Weld quality-monitoring means for welding equipment having a plurality of spaced electrodes and means for applying clamping pressure and welding power to opposite sides of parts to be welded together, said monitoring means including inductance means having a movable core connected to one of the electrodes to move therewith and change the inductance value of the inductance means, demodulator means connected to the inductance means, a plurality of quality-monitoring circuits connected to the demodulator means including a soft point-monitoring circuit having a differentiating means for producing a soft point signal when a soft point is reached during the welding operation, the differentiating means being connected to the demodulator means, a count-controlled gate connected to the differentiating means, means for energizing the gate to accept the soft point signal during a predetermined period and to produce a reject signal when the soft point signal occurs outside the predetermined period, an upset-monitoring circuit having memory means connected to the demodulator means for registering the initial position of the said one electrode, comparing means connected to the memory means and to the demodulator means for detecting electrode displacement and upset limit circuit connected to the comparing means for determining the acceptability of the amount of upset, a cold length-monitoring means comprising a cold length limit circuit connected to the memory means for determining acceptability of the initial separation of the electrodes, a cycle-monitoring means comprising cycle-counting means connected to the means for applying clamping pressure and welding power for counting the number of cycles of welding current and a cycle limit means connected thereto for determining acceptability of the number of cycles, and a reject gate means for simultaneously sampling the outputs of the count-controlled gate, the cold length limit circuit, the upset limit circuit and the cycle limit means for producing a reject signal when any of the outputs indicates that a parameter falls without its prescribed limit.

5. Weld quality-monitoring means for welding equipment as described in claim 4 wherein the cycle-counting means has outputs for controlling the count-controlled gate, and the memory means.

6. Weld quality-monitoring means for welding equipment as described in claim 4 and further including weld energy-monitoring means comprising means associated with the welding electrodes for sensing welding voltage and current, an energy-monitoring circuit responsive to such voltage and current for measuring the amount of energy consumed in making a weld nugget, an energy limit circuit connected to the energy-monitoring means for determining acceptability of the energy value measured, and for producing an output signal when the energy value is too high or too low to produce a good weld, the energy limit circuit being connected to the reject gate, whereby the reject gate produces a reject signal in response to the output signal.

7. Weld quality-monitoring means for welding equipment having a plurality of spaced electrodes and means for applying clamping pressure and welding power to opposite sides of parts to be welded together, said quality-monitoring means including sensor means connected to one of the electrodes for producing an output signal as a function of electrodes separation, energy-monitoring means associated with the welding electrodes for measuring the energy consumed in forming a weld nugget, an energy limit circuit connected to the energy-monitoring means for determining whether the value of energy consumed is between predetermined limits, upset-monitoring means comprising switching means connected to the sensor means, means for opening the switching means at the initiation of welding, a memory circuit connected to the switching means for registering a signal indicative of the initial position of the one electrode, a comparison circuit connected to the sensor means and the memory circuit for determining the difference between the initial electrode position and its final position thereby providing a measure of upset, an upset limit circuit connected to the comparison circuit for determining whether the amount of upset is within predetermined limits, and gate means connected to the energy limit circuit and upset limit circuit for producing a reject output signal when the energy level or upset is without predetermined limits, and utilization means responsive to the reject output signal.

8. A method of monitoring the quality of a weld during formation of the same by the application of electrical power comprising the steps of clamping the parts to be welded between the welding electrodes and maintaining pressure thereon, obtaining an electrical signal value that is representative of the distance between the adjacent ends of the electrodes, storing the same for reference, applying welding power and completing the weld to soften the material permitting the electrodes to press into the surface, obtaining a second signal representative of final electrode spacing at the conclusion of the weld, determining the difference between the signals to obtain a difference signal and utilizing said difference signal to indicate the quality of the weld obtained.

9. A method of monitoring the quality of a weld during formation of the same by the application of electrical power comprising the steps of clamping the parts to be welded between welding electrodes and maintaining pressure thereon, producing a first electrical signal that is proportional to the separation of the adjacent ends of the electrodes, storing the value of the first electrical signal, applying welding power and completing the weld to permit the electrode separation to decrease, producing a second signal proportional to final electrode separation at the conclusion of the weld, determining the difference between the second signal and the stored value of the first signal to obtain a difference signal, producing a reject signal when the difference signal is outside an acceptable range, and operating a control means in response to the reject signal.